US008290096B2

(12) United States Patent  (10) Patent No.: US 8,290,096 B2
Shim et al.  (45) Date of Patent:  Oct. 16, 2012

(54) RADIUS ADAPTIVE SPHERE DECODING WITH PROBABILISTIC NOISE CONSTRAINT

(75) Inventors: Byonghyo Shim, Seoul (KR); Insung Kang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 868 days.

(21) Appl. No.: 12/102,803

(22) Filed: Apr. 14, 2008

(65) Prior Publication Data

US 2009/0257530 A1  Oct. 15, 2009

(51) Int. Cl.
*H04L 27/06* (2006.01)
(52) U.S. Cl. .................. 375/341; 375/265; 714/796
(58) Field of Classification Search .............. 375/147, 375/262, 265, 340, 341; 714/792, 794, 796
See application file for complete search history.

(56) References Cited

U.S. PATENT DOCUMENTS

| 2005/0008091 | A1* | 1/2005 | Boutros et al. .......... 375/267 |
| 2007/0286313 | A1* | 12/2007 | Nikopour-Deilami et al. ............. 375/341 |
| 2008/0181339 | A1* | 7/2008 | Chen et al. ............. 375/341 |
| 2008/0232455 | A1* | 9/2008 | Abou Rjeily ............ 375/233 |
| 2008/0313252 | A1* | 12/2008 | Kim et al. .............. 708/441 |

OTHER PUBLICATIONS

Arnoud A et al: "An iterative space-time detector managing the performance-complexity trade-off" Communications, Signals and Coding, 2008. MIC-CSC 08. Proceedings of the Mosharaka International Conference on, IEEE, Piscataway, NJ, USA, Oct. 17, 2008, pp. 9-15, XP031474876 ISBN: 978-9957-486-05-1 equation (14).
Byonghyo Shim et al: "On radius control of tree-pruned sphere decoding" Acoustics, Speech and Signal Processing, 2009. ICASSP 2009. IEEE International Conference on, IEEE, Piscataway, NJ, USA, Apr. 19, 2009, pp. 2469-2472, XP031459768 ISBN: 978-1-4244-2353-8 the whole document.
Byonghyo Shim et al: "Radius-adaptive sphere decoding via probabilistic tree pruning" Signal Processing Advances in Wireless Communications, 2007. SPAWC 200 7. IEEE 8th Workshop on, IEEE, PI, Jun. 1, 2007, pp. 1-5, XP031189401 ISBN: 978-1-4244-0954-9 sections 3-5.
Byonghyo Shim et al: "Sphere Decoding With a Probabilistic Tree Pruning" IEEE Transactions on Signal Processing, IEEE Service Center, New York, NY, US LNKD-DOI:10.1109/TSP.2008.923808, vol. 56, No. 10, Oct. 1, 2008, pp. 4867-4878, XP011234674 ISSN: 1053-587X the whole document.
Byonghyo Shim et al: "Towards the Performance of ML and the Complexity of MMSE—A Hybrid Approach" Global Telecommunications Conference, 2008. IEEE Globecom 2008. IEEE, IEEE, Piscataway, NJ, USA, Nov. 30, 2008, pp. 1-5, XP031370346 ISBN: 978-1-4244-2324-8 equation (14) the whole document.

(Continued)

*Primary Examiner* — Dac Ha
(74) *Attorney, Agent, or Firm* — Kevin T. Cheatham

(57) ABSTRACT

Method and apparatus for decoding code words received over a communication channel are disclosed. A radius-adaptive sphere decoding methodology reduces the number of operations in sphere-constrained search. Imposing probabilistic noise constraint on top of sphere constraint, particularly at an early stage, provides a more stringent necessary condition. Hence, many branches that are unlikely to be selected are removed in the early stage of sphere search. The trade-off between computational complexity and performance can be controlled by adjusting the pruning probability.

39 Claims, 12 Drawing Sheets

OTHER PUBLICATIONS

Christoph Studer et al: "Soft-output sphere decoding: algorithms and VLSI implementation" IEEE Journal on Selected Areas in Communications, IEEE Service Center, Piscataway, US, vol. 26, No. 2, Feb. 1, 2008, pp. 290-300, XP011200796 ISSN: 0733-8716 p. 290, right-hand col., paragraph 2 p. 296, left-hand col., paragraph 1-paragraph 4.

Hassibi B et al: "Iterative Decoding for MIMO Channels Via Modified Sphere Decoding" IEEE Transactions on Wireless Communications, IEEE Service Center, Piscataway, NJ, US, vol. 3, No. 6, Nov. 1, 2004, pp. 2299-2311, XP011124316 ISSN: 1536-1276 section IV.

International Search Report & Written Opinion—PCT/US2009/040401, International Search Authority—European Patent Office—Dec. 22, 2009.

Jalden J et al: "Parallel Implementation of a Soft Output Sphere Decoder" Signals, Systems and Computers, 2005. Conference Record of the Thirty-Ninth Asilomar Conference on, Pacific Grove, California, IEEE, Piscataway, NJ, USA, Oct. 28, 2005, pp. 581-585, XP010900066 ISBN: 978-1-4244-0131-4, section III-A.

John Mingers: "An Empirical Comparison of Pruning Methods for Decision Tree Induction" Machine Learning, Kluwer Academic Publishers-Plenum Publishers, NE, vol. 4, No. 2, Nov. 1, 1989, pp. 227-243, XP019213357 ISSN: 1573-0565 section 2.2.1.

Radhika Gowaikar et al: "Statistical Pruning for Near-Maximum Likelihood Decoding" IEEE Transactions on Signal Processing, IEEE Service Center, New York, NY, US, vol. 55, No. 6, Jun. 1, 2007, pp. 2661-2675, XP011181933 ISSN: 1053-587X section VI-B.

Various: "A-star search algorithm" [Online] Sep. 23, 2009, Wikipedia, XP002547428 Retrieved from the Internet: URL:http://en.wikipedia.org/wiki/A*_search_algorithm> [retrieved on Sep. 23, 2009] p. 1-p. 7.

Various: "Bisection method" [Online] Sep. 24, 2009, Wikipedia, XP002547429 Retrieved from the Internet: URL:http://en.wikipedia.org/wiki/Bisection_method> [retrieved on Sep. 24, 2009] p. 1-p. 4.

Weiyu Xu et al: "A new exact closest attice point search algorithm using linear constraints" Signal Processing Advances in Wireless Communications, 2007. SPAWC 200 7. IEEE 8th Workshop on, IEEE, Pl, Jun. 1, 2007, pp. 1-5, XP031189371 ISBN: 978-1-4244-0954-9 section 4, paragraph 1.

Agrell, et al., "Closest point search in lattices", IEEE Trans. Inform. Theory, 2002, vol. 48(8), pp. 2201-2214.

Fincke, et al., "Improved methods for calculating vectors of short length in a lattice, including a complexity analysis," Mathematics of Computation, 1985, vol. 44(170), pp. 463-471.

\* cited by examiner

RADIUS ADAPTIVE SPHERE DECODING WITH PROBABILISTIC NOISE CONSTRAINT

BACKGROUND OF THE INVENTION

Wireless communication systems are widely deployed to provide various types of communication content, such as, voice, media, data, and so on. These systems may be multiple-access systems capable of supporting communication with multiple users by sharing available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can concurrently support communication for multiple wireless terminals. Each terminal communicates with one or more base stations via transmissions on forward and reverse links. The forward link (or downlink) refers to a communication link from base stations to terminals, and the reverse link (or uplink) refers to a communication link from terminals to base stations. This communication link may be established via one or more of single-in-single-out (SISO), multiple-in-single-out (MISO) or multiple-in-multiple-out (MIMO) systems.

A MIMO system employs multiple ($N_T$) transmit antennas and multiple ($N_R$) receive antennas for data transmission. A MIMO channel formed by $N_T$ transmit and $N_R$ receive antennas may be decomposed into N independent channels, which are also referred to as spatial channels, where $N_S \leq \min\{N_T, N_R\}$. Each of the $N_S$ independent channels corresponds to a dimension. The channels are used to transmit data in a manner that provides higher overall throughput and greater reliability.

The transmitter may encode and transmit N data symbols in a sequential or parallel manner via one or more transmit antennas which may be obtained at the receiver via one or more receive antennas. The receiver upon obtaining the symbols performs detection and decoding on the detected symbols to recover the transmitted data. In order to decode symbols with great accuracy, the receiver would need to evaluate many hypotheses for all possible sequences of data bits that might have been transmitted based on all of the information available at the receiver. Such an exhaustive search involves high computational intensity and may be impractical for many applications. It is therefore desirable to explore techniques that reduce computational intensity/complexity without significantly sacrificing accuracy.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with systems and methods described herein a probabilistic noise constraint is applied in addition to sphere constraint while decoding received data by employing Sphere Decoding methodology thereby achieving an optimal decoding procedure that balances speed of decoding with accuracy of the decoded data. In particular, a method of decoding is disclosed in accordance with an aspect wherein one or more code words are initially received in a transmission. The received code words are represented by lattice points in a lattice field. A pruning probability is generated for at least one code word received in the transmission in addition to determining a radius for a search sphere for the received code word. Lattice points inside the sphere comprised in one or more layers having probabilities greater than the determined pruning probability are enumerated. A nearest lattice point to the received code word is determined and data associated with the nearest lattice point is output as the received code word. In accordance with an aspect, the pruning probability is determined by modeling contributions from later layers of the system matrix by equivalent Gaussian noises. A plurality of pruning probabilities corresponding to system matrices each having different number of layers can be pre-computed and stored in a look up table.

This method can further facilitate determining if a value of pruning probability is appropriate for a given set of system attributes. In accordance with this aspect, a time threshold for completing the decoding operation is defined and the pruning probability is adjusted in accordance with the time taken to complete the decoding operation. Thus, the pruning probability is increased if time taken to complete the decoding is larger than the time threshold and decreased if time taken to complete the decoding operation is less than the time threshold.

Another aspect relates to an apparatus for decoding data within a communication system. The apparatus comprises a receiving module that receives one or more code words in a data transmission. A processing module which decodes at least a code word from the received transmission is also comprised within the system. The processing module decodes the received code word by enumerating lattice points inside a sphere of a pre-determined radius. Such lattice points can be comprised in one or more layers having probabilities greater than a particular pruning probability value. The processing module further comprises a probability selection module that determines the particular pruning probability value based on communication system attributes conducting the decoding. The processing module can also select the pruning probability from a plurality of pre-computed pruning probability values for different system attributes stored in a memory module associated with the apparatus. The processing module further comprises a pruning module that prunes branches of a binary tree associated with the decoding based on the particular pruning probability value as determined by the probability selection module. An output module outputs data associated with a lattice point nearest to the received code word as the received data.

In accordance with another aspect, a processor readable medium comprising instructions for decoding received data is disclosed. The instructions facilitate a processor to receive one or more code words in a data transmission and generate a pruning probability for at least one code word. The instructions further facilitate enumerating all lattice points inside a sphere of a determined radius wherein the lattice points are comprised in one or more layers having probabilities greater than the determined pruning probability. A lattice point nearest to the received code word is determined and data associated with the nearest lattice point is output as the received data.

In yet another aspect, an apparatus for decoding data transmitted within a communication system is disclosed. The apparatus comprises means for receiving and means for processing. The means for receiving receives one or more code words in a data transmission. The means for processing decodes one or more code words from the received transmission by enumerating all lattice points inside a sphere of a determined radius wherein the lattice points are comprised in one or more layers having probabilities greater than a particular pruning probability value. The system also comprises an output means that provides data associated with a lattice point nearest to the received code word as the received data.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
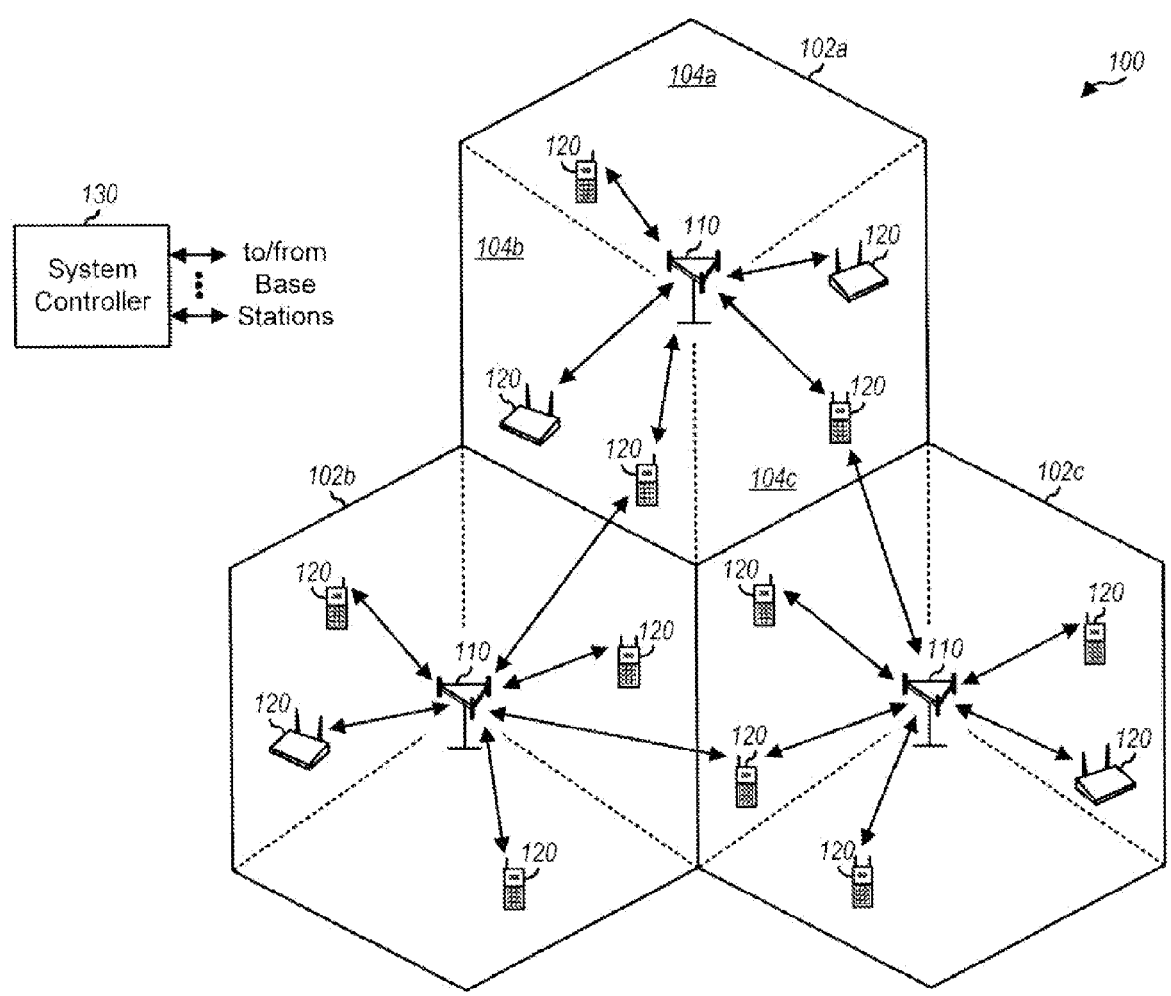
FIG. 1 is an illustration of a wireless multiple-access communication system in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Artificial intelligence (AI) can be employed to identify a specific context or action, or generate a probability distribution of specific states of a system or behavior of a user without human intervention. Artificial intelligence relies on applying advanced mathematical algorithms—e.g., decision trees, neural networks, regression analysis, cluster analysis, genetic algorithm, and reinforced learning—to a set of available data (information) on the system or user.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to the drawings, FIG. 1 is an illustration of a wireless multiple-access communication system 100 in accordance with various aspects. In one example, the wireless multiple-access communication system 100 includes multiple access points (APs) 110 and multiple access terminals (ATs) 120. A base station may also be called, and may contain some or all of the functionality of, an access point, a Node B, and/or some other network entity. Each access point 110 provides communication coverage for a particular geographic area 102 (e.g., 102a, 102b, 102c). The term "cell" can refer to an access point and/or its coverage area depending on the context in which the term is used. To improve system capacity, an access terminal coverage area may be partitioned into multiple smaller areas, e.g., three smaller areas 104a, 104b, and 104c. Each smaller area is served by a respective base transceiver subsystem (BTS). The term "sector" can refer to an AP and/or its coverage area depending on the context in which the term is used. For a sectorized cell, the APs for all sectors of that cell are typically co-located within the base station for the cell. The signaling transmission techniques described herein may be used for a system with sectorized cells as well as a system with un-sectorized cells. For simplicity, in the following description, the term "base station" is used generically for a station that serves a sector as well as a station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 130 couples to APs 110 and provides coordination and control for these base stations. System controller 130 may be a single network entity or a collection of network entities. For a distributed architecture, the APs may communicate with one another as needed.

Figure 2:
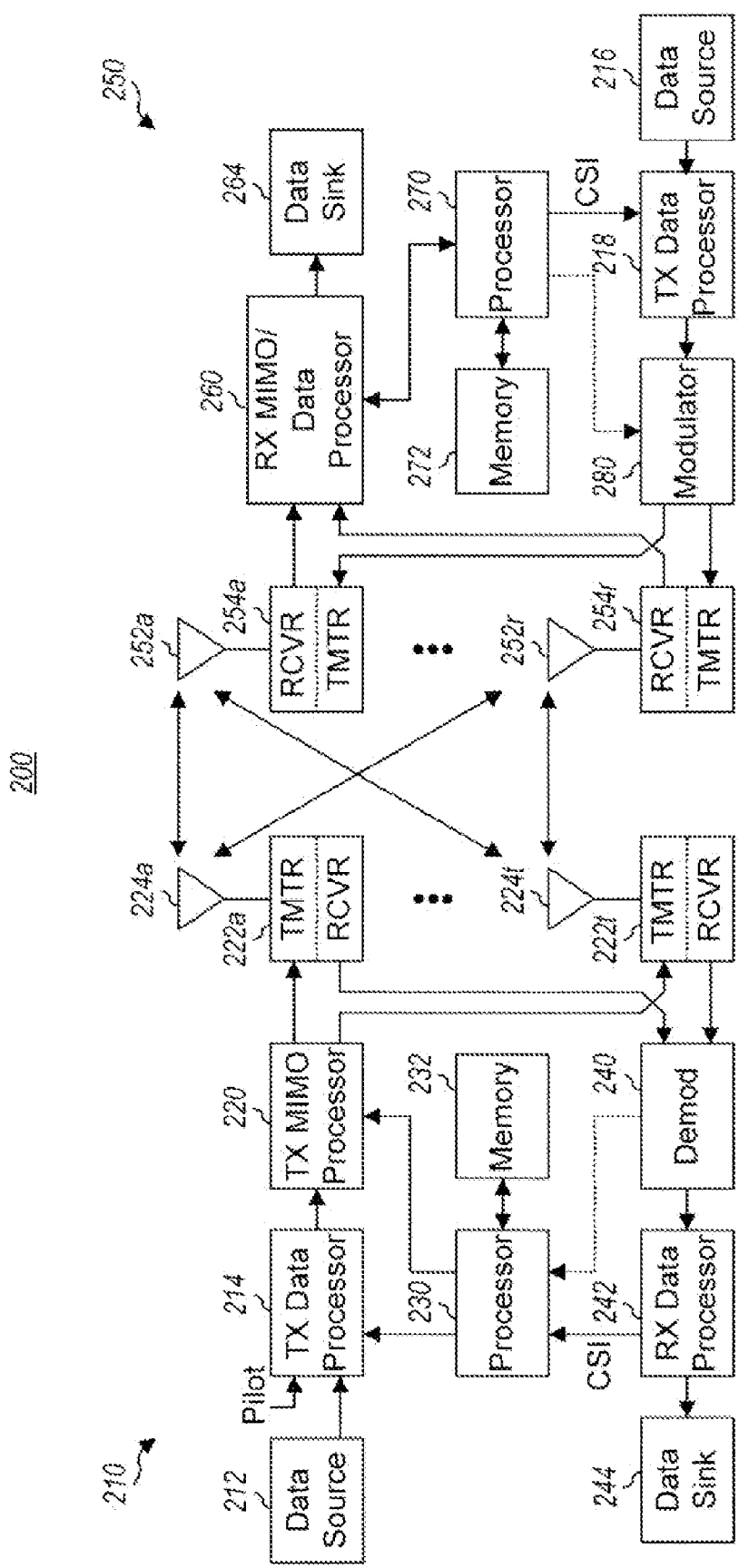
FIG. 2, a block diagram of an embodiment of a transmitter system and a receiver system in a MIMO system is illustrated.

Referring to FIG. 2, a block diagram of an embodiment of a transmitter system 210 and a receiver system 250 in a MIMO system 200 is illustrated. At transmitter system 210, traffic data for a number of data streams is provided from a data source 212 to transmit (TX) data processor 214. In an embodiment, $N_S$ data streams are transmitted over $N_T$ transmit antennas. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK (binary phase shift keying), QSPK (quadrature phase shift keying), M-PSK (multi-phase shift keying), or M-QAM (multi-level quadrature amplitude modulation)) selected for that data stream to provide modulation symbols. The data rate, coding, and modulation for each data stream may be determined by instructions performed on provided by processor 230.

The modulation symbols for data streams are then provided to a TX processor 220, which may further process the modulation symbols (e.g., for OFDM). TX processor 220 then provides $N_T$ modulation symbol streams to $N_T$ transmitters (TMTR) 222a through 222t. Respective transmitter(s) 222 receive and process a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_S$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX processor 260 may derive an estimate of the channel response between the $N_T$ transmit and $N_R$ receive antennas, e.g., based on the pilot information multiplexed with the traffic data. RX processor 260 may identify the pilot symbols according to pilot patterns stored in memory, e.g., memory 272 that identify the frequency subcarrier and symbol period assigned to each pilot symbol. In addition, the user specific and sector specific scrambling sequences may be stored in memory so that they may be utilized by RX processor 260 to multiple the received symbols so that the proper decoding can occur.

To decode the pilot and data symbols during handoff, the RX processor 260 and processor 270 may separately extract the pilot symbols from each sector that uses one of the pilot patterns assigned for handoff. The pilot symbols, and associated data symbols, that are transmitted according one of the pilot patterns assigned for handoff are decoded for each sector and may then be combined from all of the sectors. The combining may be performed, as previously stated, by utilizing maximum ratio combining (MRC) or other known techniques. The RX data processor 260 then processes the data symbol estimates and provides decoded data to a data sink 264 and signaling to a controller/processor 270.

The channel response estimate generated by RX processor 260 can be used to perform space, space/time processing at the receiver, adjust power levels, change modulation rates or schemes, or other actions. RX processor 260 can further estimate the signal-to-noise-and-interference ratios (SNRs) of the detected symbol streams, and possibly other channel characteristics, and provides these quantities to a processor 270. RX data processor 260 or processor 270 may further derive an estimate of the "operating" SNR for the system.

Processor 270 then provides channel state information (CSI), which may comprise various types of information regarding the communication link and/or the received data stream. For example, the CSI may comprise only the operating SNR. The CSI and data from a data source 216 is then processed by a TX data processor 218, modulated by a modulator 280, conditioned by transmitters 254a through 254r, and transmitted back to transmitter system 210.

In addition, the SNR estimates can be utilized to determine location of a mobile station, which is transmitting pilot symbols, within a cluster of a cell or a cell. This information then can be utilized to determine a pilot pattern to assign to the mobile station. In some embodiments, memories 232 and 272 may contain identifiers that correspond to the different pilot patterns that can be utilized within the wireless communication systems. The memories can identify the pilot patterns based upon whether they are to be used for handoff or if the location of the mobile station indicates that it is near a cell or sector boundary. The pilot patterns may also have the same pilot symbol locations but have user specific and/or sector specific scrambling sequences, depending on how the different pilot patterns are distinguished from each other. These identifiers can then be transmitted from the transmitter to the receiver and then utilized by the receiver to modulate the pilot symbols according to the identified pilot pattern.

At transmitter system 210, the modulated signals from receiver system 250 are received by antennas 224, conditioned by receivers 222, demodulated by a demodulator 240, and processed by a RX data processor 242 to recover the CSI reported by the receiver system and provide decoded data to data sink 244. The reported CSI is then provided to processor 230 and used to (1) determine the data rates and coding and modulation schemes to be used for the data streams and (2) generate various controls for TX data processor 214 and TX processor 220.

Processors 230 and 270 direct operation at the transmitter and receiver systems, respectively. Memories 232 and 272 provide storage for program codes and data used by processors 230 and 270, respectively. The memories 232 and 272 store the pilot patterns in terms of cluster locations, user specific scrambling sequences, sector specific scrambling sequences, if utilized, and cell specific scrambling sequences, if utilized.

Processors 230 and 270 then can select which of the pilot patterns, user specific scrambling sequences, sector specific scrambling sequences, and cell specific scrambling sequences are to be utilized in transmission of the pilot symbols.

At the receiver, various processing techniques can be used to process the $N_R$ received signals to detect $N_S$ transmitted symbol streams. While FIG. 2 discusses a MIMO system, the same system can be applied to a multi-input single-output system where multiple transmit antennas, e.g., those on a base station, transmit one or more symbol streams to a single antenna device, e.g., a mobile station. Also, a single output to single input antenna system may be utilized in the same manner as described with respect to FIG. 2.

In communication systems the relationship between the transmitted symbol vector and the received symbol vector is given by:

$$y=Hs+v \quad (1)$$

where s is a m-dimensional vector whose entries are elements of L-level set of complex numbers, $y \in C^n$ is the received signal, $v \in C^n$ is the noise vector and $H \in C^{n \times m}$ is a channel matrix.

Under the assumption that channel matrix is known, the maximum likelihood (ML) decoding problem is formulated as:

$$\min_{s \in D_L^m} \|y - Hs\|^2 \quad (2)$$

Although ML decoding is optimal for achieving minimum error probability, it is paid little attention due the exponential complexity it results in based on the length of the received codeword. However, it has gained more attention recently due to a lower-complexity modification known as Sphere decoding (SD) algorithm.

Figure 3:
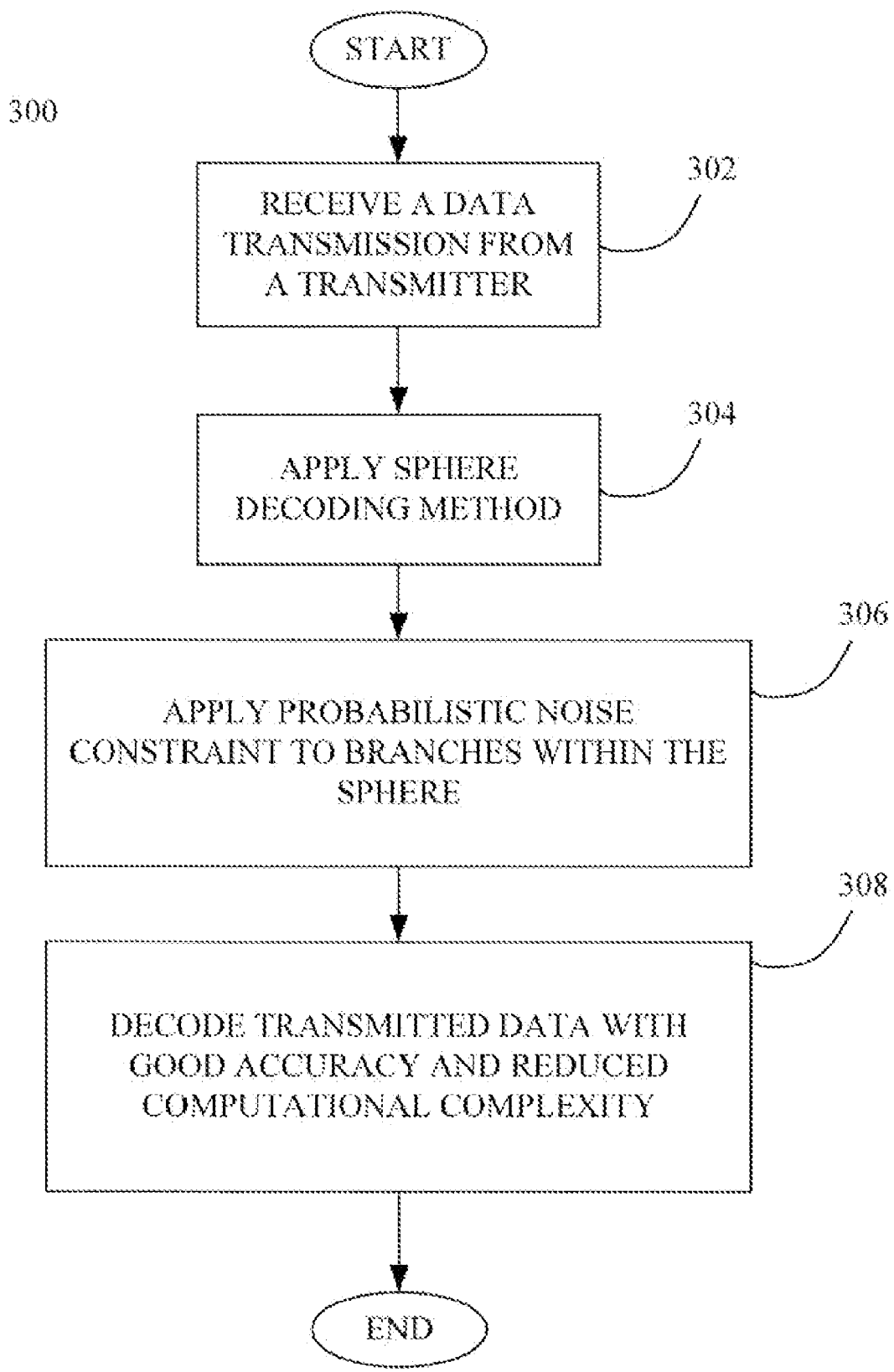
FIG. 3 is a flow chart illustrating a methodology that facilitates decoding received symbols with good accuracy but reduced computational complexity.

Turning specifically to FIG. 3, a methodology 300 that facilitates decoding received symbols with good accuracy but reduced computational complexity is disclosed. The method begins with receiving code words generated by the transmitter at the receiver as shown at 302. Generally data to be transmitted is scrambled, interleaved and transmitted to user devices. At the receiver it is descrambled, deinterleaved, despread and may be provided to a combiner to generate transmitted symbols. As discussed supra, various methods can be employed in order to decode the transmitted data. These methods may involve tradeoffs between accuracy and computational intensity. Accordingly, sphere decoding method is applied at 304 in order to decode the transmitted symbols at the receiver.

The principle of SD algorithm is to search the closest lattice point to the received vector within a sphere of radius $\sqrt{c}$ where each vector (codeword) Hs is represented by a lattice point in a lattice field. Since sphere decoding outputs any lattice point inside the sphere, the nearest lattice point to the received vector, or ML solution is found by enumerating all the lattice points inside the sphere. Although, SD algorithm offers significant reduction in computational complexity, it still requires considerable computation as compared with MMSE (minimum mean square error) or similar techniques.

Lattice codes in SD algorithm are constructed in n-dimensional Euclidean space $R^n$. Hence, complex system matrix is reformulated to a real matrix with double dimension:

$$y=Hs+v \rightarrow y'=H's'+v' \quad (3)$$

where s'v' is the set of L-level integer vector and $$H' = \begin{bmatrix} \text{Re}\{H\} & -\text{Im}\{H\} \\ \text{Im}\{H\} & \text{Re}\{H\} \end{bmatrix}, s' = \begin{bmatrix} \text{Re}\{s\} \\ \text{Im}\{s\} \end{bmatrix}, \text{ and } v' = \begin{bmatrix} \text{Re}\{v\} \\ \text{Im}\{v\} \end{bmatrix} \quad (4)$$

For notational simplicity, we use y=Hs+v even after real matrix conversion. SD algorithm can be summarized as follows: Let $c_0$ be the squared radius of an n-dimensional sphere $S(y,c_0)$ centered at y. SD algorithm aims at finding a list of all the lattice points s inside the sphere by converting H into a triangular matrix through QR-decomposition wherein Q and Q' are n×m and n×(n−m) unitary matrices respectively and R is an m×m upper triangular matrix with positive diagonal elements, O is an (n−m)×m zero matrix. Accordingly, Eq. (4) now transforms into:

$$H = [Q \quad Q'] \begin{bmatrix} R \\ O \end{bmatrix} \quad (5)$$

The requirement that a lattice point belongs in the sphere or $Hs \in S(y,\sqrt{c_0})$ is expressed as $$c_0 \geq \|y - Hs\|^2 \quad (6)$$

$$= \left\| [Q \; Q']^T y - \begin{bmatrix} R \\ O \end{bmatrix} s \right\|^2 \quad (7)$$

$$d_0 \geq \|y' - Rs\|^2 \quad (8)$$

where $y'=Q^T y$ and $d_0 = c_0 - \|Q'^T y\|^2$ where $d_0$ denotes modified radius of the sphere. Considering the upper triangular form in R matrix, the matrix structure of $y'-Rs$ is:

$$\begin{bmatrix} y'_1 \\ y'_2 \\ \vdots \\ y'_m \end{bmatrix} = \begin{bmatrix} r_{1,1} & r_{1,2} & & r_{1,m} \\ & r_{2,2} & \cdots & r_{2,m} \\ & & \ddots & \vdots \\ & & & r_{m-1,m} \\ & & & r_{m,m} \end{bmatrix} \begin{bmatrix} s_1 \\ s_2 \\ \vdots \\ s_m \end{bmatrix} \quad (9)$$

In accordance with SD algorithm the solution to equation (8) can be found recursively. Since s is an element of a discrete set, the candidates can be enumerated and those candidates that satisfy the sphere condition in equation (8) can be chosen. Towards this end, equation (8) can be rewritten as:

$$d_0 \geq (y'_m - r_{m,m} s_m)^2 + (y'_{m+1} - r_{m+1,m} s_m - r_{m+1,m-1} s_{m+1})^2 + \quad (10)$$

In the Viterbi algorithm parlance, each term in the right side corresponds to the branch metric $B_n$, $n=1, \ldots, m$. Since SD algorithm starts from the bottom layer of the matrices in equation (9) and traces upward, the recursive relationship becomes $$P_m = B_m \quad (11)$$

$$P_n = P_{n+1} + B_n, n = m-1, \ldots, 1 \quad (12)$$

For the first layer (or the bottom layer) the necessary condition for Hs being inside the sphere of squared radius $c_0$ is:

$$d_0 \geq (y'_m - r_{m,m} s_m)^2 \quad (13)$$

(Path metric) $P_m = B_m$ (Branch metric)
In general, the necessary condition for the nth layer can be given as:

$$d_o \geq \sum_{j=n}^{m} \left( y'_j - \sum_{k=j}^{m} r_{j,k} s_k \right)^2 = P_n = P_{n+1} + B_n \quad (14)$$

Rewriting equation (14):

$$d_o - P_{n+1} \geq \sum_{j=n}^{m} \left( y'_j - \sum_{k=j}^{m} r_{j,k} s_k \right)^2 = \text{branch metric } B_n \quad (15)$$

Generally, searching order in each layer is based on lexicographic ordering called Pohst enumeration, which checks the candidates in order of $s_{n,min}$, $s_{n,min+1}$, ... $s_{n,max}$. The complexity can be further reduced by Schnorr-Euchner enumeration where candidates are examined based on their path metric values. As shown supra, path metric can be expressed as $P_n = P_{n+1} + B_n$ and as $P_{n+1}$ is common for every candidate in current node, the ordering is effectively based on branch metric $B_n(s_n)$ given by:

$$B_n(s_n) = \left( y'_n - \sum_{k=n+1}^{m} r_{n,k} s_k - r_{n,n} s_n \right)^2 \quad (16)$$

where $s_n \in \{s_{n,min} \ldots s_{n,max}\}$ with cardinality to be $N_S = s_{n,max} - s_{n,min} + 1$. The candidates ordered by Shnorr-Euchner (SE) strategy are denoted as $s_{i,1}^0, s_{i,2}^0, \ldots, s_{i,N_s}^0, \ldots$. The Shnorr-Euchner strategy starts the search by minimizing branch metric and is therefore likely to find the right path way earlier than Pohst enumeration. Secondly, if the condition fails for $s_{i,k}^0$ then the condition will also fail for $s_{i,m}^0$ where m>k. Therefore, there would not be a need to search for the rest of the candidates in the layer. Finally, initial lattice point obtained from SE enumeration is invariant if the sphere radius is sufficiently large so that the algorithm is free from the initial radius selection.

In the methodology according to SD algorithm described above, the branches of tree with a Euclidean distance larger than the given sphere radius are never searched, which reduces the complexity of SD algorithm over exhaustive search (ML methodology) significantly. However, since the necessary condition is too loose for the bottom layer, most branches outside the sphere constraint are retained until search proceeds to the upper layers. Thus, the sphere search does not include contribution from the upper layers and therefore, sphere constraint based tree pruning is not quite effective in the bottom layers (or early layers of the binary tree). In order to prune more branches that are unlikely to be inside the sphere, a probabilistic strategy is adopted in order to determine whether to trace further into a branch of the binary tree or to remove it from the tree. Accordingly, a probabilistic noise constraint is imposed in addition to sphere constraint as shown at 306. Addition of the probabilistic noise constraint on top of the sphere constraint in the SD methodology can account for the layers not yet visited. This strengthens the necessary condition or the proposed algorithm assesses a more stringent necessary condition by adding the probabilistic noise constraint. Towards this end, the upper layer contribution is modeled by the equivalent noises. Gaussian noises are typical in communications systems. Gaussian noises are assumed in the following description but the method is not limited to Gaussian noise model. From equations (8) and (12) the modified necessary condition for the first layer becomes:

$$d_0 \geq P_m(s_m) + v_{m+1}^2 + v_{m+2}^2 + \ldots + v_1^2 \quad (17)$$

where $v_j$ is the noise of the layer j and $$\sum_{j=1}^{m-1} v_j^2$$

can be termed as probabilistic noise constraint. Addition of the probabilistic noise constraint along to the sphere constraint balances the stringency of the necessary condition applied at different layers. Generalizing this equation, the necessary condition for the nth layer becomes:

$$d_0 \geq \sum_{j=1}^{m} B_j = P_n + \sum_{j=1}^{n-1} v_j^2 \quad (18)$$

Since $v_1, v_2, \ldots v_j$ are values from independent normal distribution, $$q_{n-1} = \sum_{j=1}^{n-1} v_j^2$$

becomes the chi-square random variable with n−1 degrees of freedom ($q_{n-1} \sim \chi^2$). Using $q_{n-1}$, (18) is expressed as $$d_0 \geq P_n(s_m, \ldots, s_m) + q_{n-1} \quad (19)$$

The probability that $q_{n-1}$ is less than $d_0 - P_n(s_m, \ldots s_n)$ is:

$$Pr(d_0 - P_n(s_m, \ldots s_n) > q_{n-1}) = F(d_0 - P_n(s_m, \ldots s_n), n-1) \quad (20)$$

where $$F(q, n-1) = \frac{\gamma(k/2, q/2)}{\Gamma(k/2)}$$

is the cumulative distribution function of $q_k$, where $\Gamma$ and $\gamma$ are Gamma function and incomplete Gamma function, respectively. In order to prune the branches with rather low probability $\epsilon$ or eliminate values which have low probability of being part of the right solution, that is, to remove branches satisfying $Pr(d_0 - P_n(s_m, \ldots s_n) > q_{n-1}) < \epsilon$, we have:

$$d_0 - P_n(s_m, \ldots s_n) < \beta_{n-1} \quad (21)$$

where $$F(\beta_{n-1}; n-1) = \epsilon \quad (22)$$

Hence, $s_m, \ldots, s_n$ satisfying (21) are excluded from further search. Thus, rearranging the terms of equation (21), the tightened necessary condition becomes:

$$d_0 - \beta_{n-1} > P_n(s_m, \ldots s_n) \quad (23)$$

where n=1, ..., m. $\beta_n$ can be pre-computed by statistical packages such as Matlab® and stored into look-up table. Radius-adaptive SD method can be explained as natural extension of original SD algorithm, where the necessary condition for branch metric $B_n(s_n)$ is:

$$\frac{d_0(n)}{d_0 - \beta_{n-1}} - P_{n+1} > B_n(s_n) \quad (24)$$

In the radius-adaptive SD algorithm discussed supra, $\beta_n=0$ implies $\epsilon=0$ so that no pruning operation occurs due to the probabilistic constraint. Hence, $\epsilon$ can be referred to as a threshold for pruning probability. In accordance with another aspect, the methodology described herein can be extended by taking into consideration the prior information of each symbol received from a decoder (e.g., Turbo decoder). This can be applied into the radius as shown below in Eq. 25.

$$d_0 - \beta_{n-1} - \text{Prior}(s_n) > P_n(s_m, \ldots s_n) \quad (25)$$

Hence, sphere constraint, probabilistic noise constraint and prior constraint can all be imposed as various search constraints which can optimize the SD methodology to be more efficient in terms of computational complexity.

Figure 4:
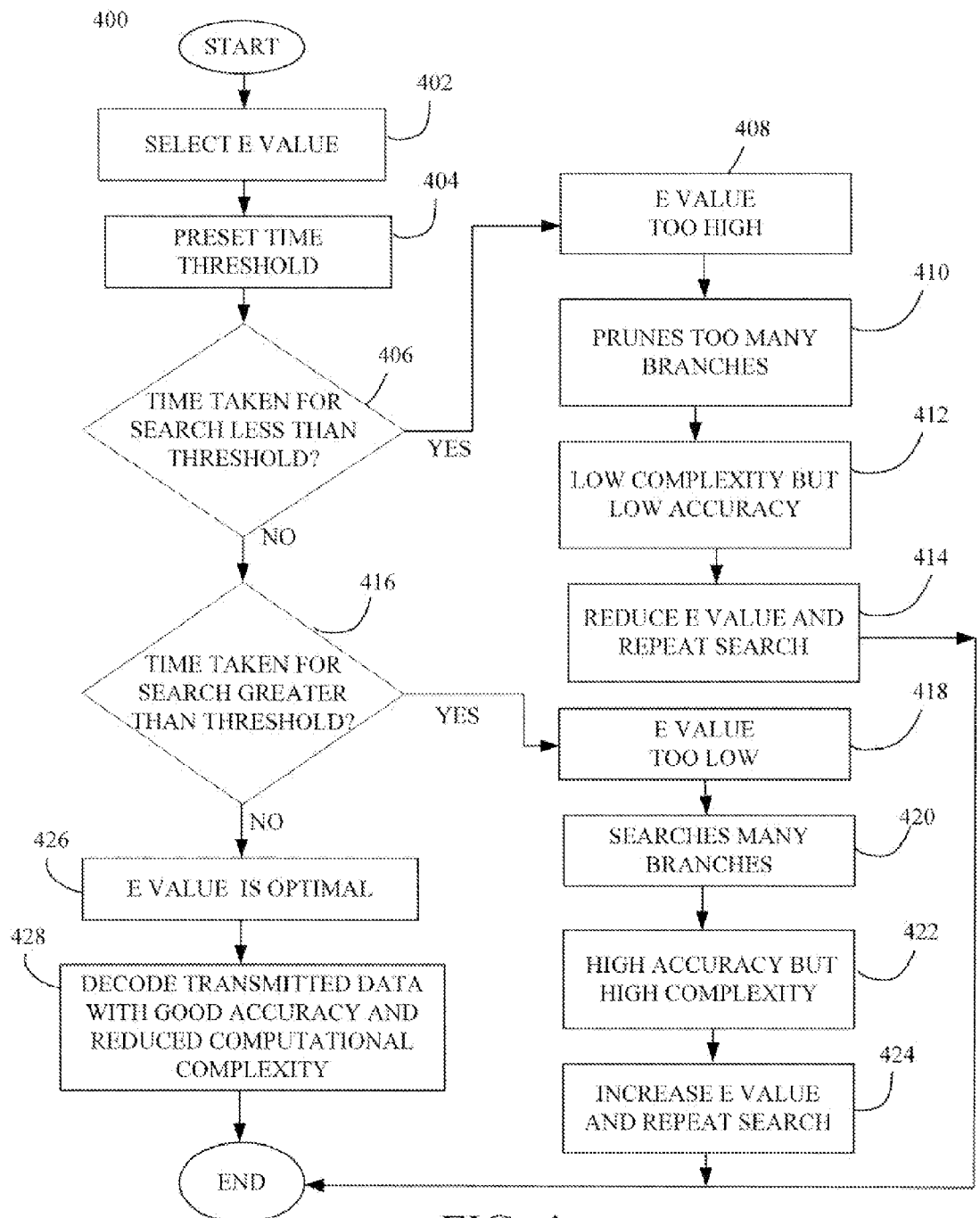
FIG. 4 is a flow chart illustrating an aspect that shows the effect of choice of $\epsilon$.

As mentioned supra and as evident from equation (22) $\epsilon$ is a function of $\beta_n$ where $\beta_n$ is pre-computed by statistical packages. Therefore, an optimal choice of value for $\epsilon$ influences the effect of addition of probabilistic noise constraint to the sphere constraint in the SD algorithm. This aspect is further detailed in the FIG. 4 which illustrates an aspect showing the effect of choice of $\epsilon$. In accordance with this aspect, an $\epsilon$ value is initially chosen as shown at 402 in order to apply probabilistic noise constraint to SD algorithm. This choice of $\epsilon$ is generally a tradeoff between performance and computational complexity. A balance between these two aspects can be achieved by monitoring the time taken for completing a search. This can be done by presetting a threshold time interval in which the search should be completed as shown at 404. As shown at 406 if the time taken to identify the initial candidate is very low as compared to the threshold set at 404, it implies that a non-optimal value, such as large value is chosen for $\epsilon$. This is shown at 408 wherein the probability value for selecting candidate solutions for decoding symbols very high. Accordingly, as shown at 410 it can be concluded that too many branches of the tree have be pruned and therefore the search may be completed in a very short time period. While this results in lower computational complexity, it also results in performance loss or low accuracy of the decoded result as shown at 412. In order to improve performance, the search can be repeated with a lower $\epsilon$ value as shown at 414 thereby allowing search over greater number of branches and hence resulting in increased accuracy. On the other hand, if the time taken for completing the operation is much larger than the preset threshold as shown at 416, it can be concluded that another non-optimal value, such as a very low value is chosen for $\epsilon$ as shown at 418. This implies that the threshold probability for selection of candidates is very low which results in a number of branches of the binary tree being considered as candidate solutions or being searched as shown at 420. As a result, the performance may be very good since many candidates are considered, however, such thorough search leads to more intensive computations as shown at 422. Under such circumstances, it may take a longer time interval to complete the search due to increased complexity. Hence, the search may be repeated by increasing the $\epsilon$ value as shown at 424. Finally, if an optimal value for $\epsilon$ is chosen as shown at 426, it results in decoding received data with sufficient accuracy while maintaining a reasonable computation complexity as shown at 428.

Although the procedure has been described with respect to a single search operation, it can be appreciated that adjustment of pruning probability can be applied either within a single SD operation or across separate, individual SD operations. For example, if the complexity of a previous SD operation is very high, then it may take a long time to identify a candidate solution in which case the pruning probability may be increased for a subsequent SD operation as described supra. On the other hand, if the complexity of a previous SD operation is very low, then it may take less time to identify a candidate solution in which case the pruning probability may be decreased for a subsequent SD operation as described supra. The time threshold can be determined by various AI techniques. For example, optimal time interval as well as pruning probability values can be learnt by observing different SD operations and determining acceptable time intervals thereby striking a balance between time and accuracy.

Figure 5A:
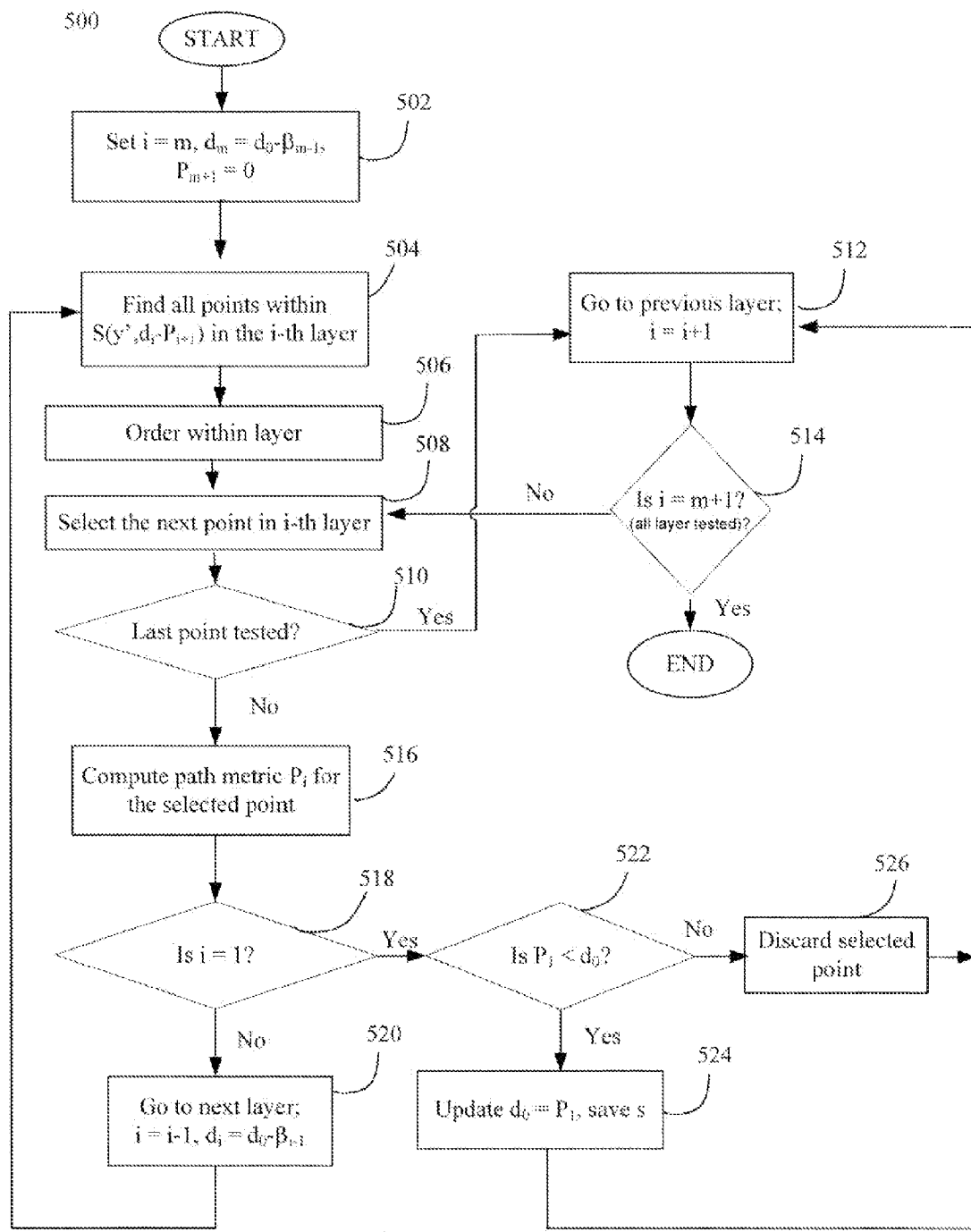
FIG. 5A illustrates a methodology of decoding received syllables in accordance with an aspect.
Figure 5B:
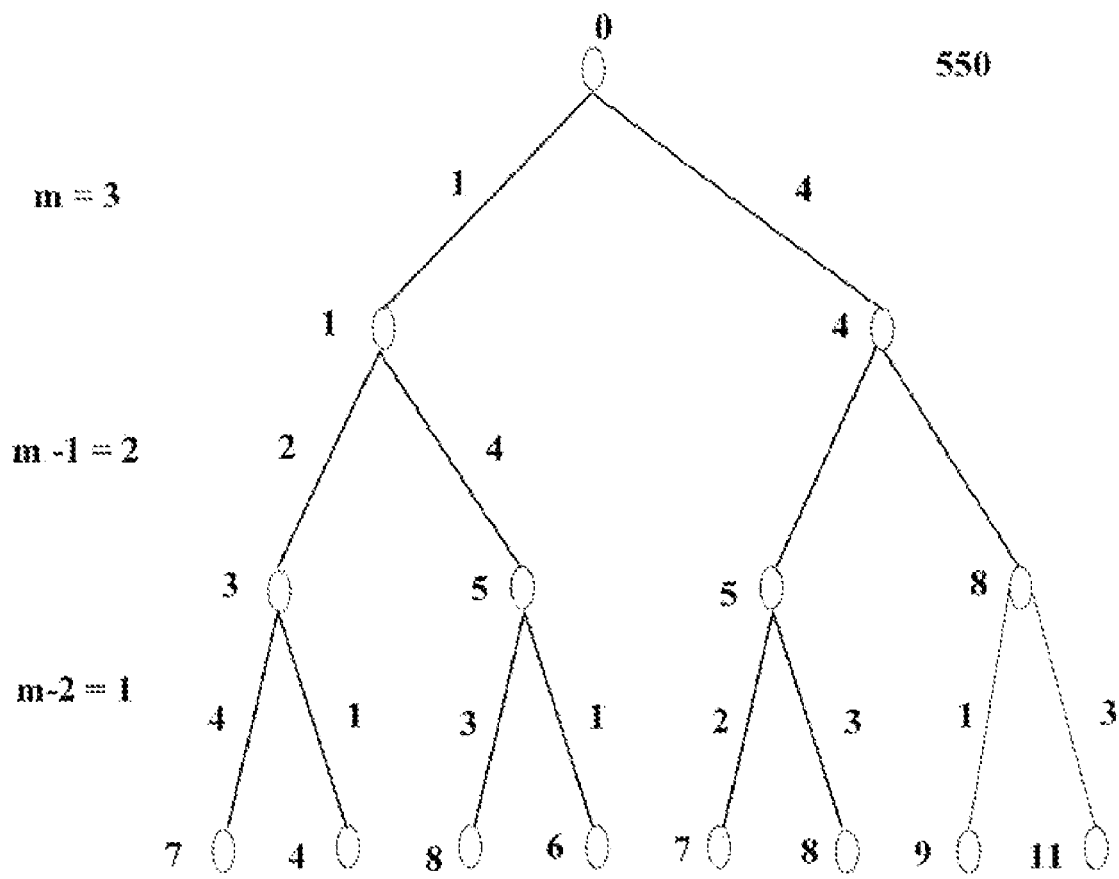
FIG. 5B illustrates a binary search tree that implements a search methodology in accordance with an aspect.

FIG. 5A illustrates a methodology of decoding received syllables in accordance with an aspect. The input to the decoding operation are: $d_0 = c_0 - \|Q'^T y\|^2$ where $d_0$ represents modified radius of the sphere, $\beta$ which is a value precomputed by statistical packages, $y' = Q^T y$ and R which are obtained from QR decomposition detailed supra. The output of the operation would be s which is the alphabet candidate or an estimation of the received data, i and k are counters denoting the layer being sorted and lattice points within the layer respectively. The flow chart in FIG. 5A traces the search procedure as implemented in the binary tree 550 shown in FIG. 5B. In FIG. 5B, the branch metrics are denoted next to the branches and the path metrics are denoted next to the nodes. For ease of explanation, the path metric will be used when identifying nodes. The different nodes with the same path metric will be easily discerned based on the context.

The procedure begins at 502 with initializing variables. Accordingly, i is initialized to m, $d_i$ is initialized to $d_0-\beta_{m+1}$ ($d_0$ is set to an arbitrarily large number.) and $P_i$ the path metric of a layer prior to the layer being examined is initialized to zero. Therefore, $P_i=P_{m+1}=0$. The method proceeds to 504 wherein all the points within the search sphere at the selected first (i=m) layer, centered at y' and of radius $d_i-P_{i+1}$ are identified. Accordingly, lattice points 1 and −1 (assuming that the left branch is related with lattice point 1 and the right branch is with lattice point −1) with the branch metrics 1 and 4 are identified for the first layer. The identified points are ordered as shown at 506 in accordance with their branch metric as further detailed infra. Thus, the initial point is 1 and the second point is −1 based on respective branch metric values. Upon ordering, a point is selected as shown at 508 and accordingly, initial point 1 is selected. At 510, it is determined if all points are already selected and tested so that there are no more points to be selected at 508. If at 510, it is determined that the last point is not selected, then the path metric for the point selected at 508 is computed as shown at 516. Accordingly as 1 is selected, the method proceeds to 516 wherein the path metric for 1, the currently selected point is determined to be 1. If the determination at 510 is true then the procedure moves to a previous layer in the binary tree by incrementing i to i+1 as shown at 512 since all points in the current layer are already tested. At 518 it is determined if the current layer being examined is the bottom most layer of the binary tree. This condition will evaluate to a false value for currently selected point 1 and therefore, the method proceeds to 520 wherein the layer index i is decremented to i−1 and the new radius of the sphere would now be $$d_i=d_0-\beta_{i-1}.$$

The procedure returns to 504 where all points within the sphere of the changed radius at the second layer (i=m−1) are identified and ordered as shown at 506. Accordingly, points 1 and −1 are identified with branch metrics 2 and 4 and are ordered with 1 as the initial point and −1 as the next point. At 508 a next point is selected and accordingly 1 is selected for testing. At 510, it is determined that a last point was not tested and accordingly the procedure moves to 516 wherein the path metric for the selected point 1 is computed. At 518 it is determined that the current layer is not the first or the bottom most layer and accordingly i is again decremented to i−1 and a new value for the radius $d_i=d_0-\beta_{i-1}$ is evaluated as shown at 520. The procedure again returns to 504 wherein all points within the sphere are identified, ordered and a point −1 with the branch metric 1 is selected for testing. At 510, it is determined that −1 is not the last point in this layer and therefore path metric for −1 is computed as shown at 516. At 518, it is determined that i is indeed equal to 1 and therefore the procedure branches out to 522 wherein the path metric for the currently selected point −1 is evaluated to determine if it satisfies the condition to be considered as a candidate alphabet. If yes, the method moves to 524 wherein $d_0$ is updated to the path metric of −1 and all the lattice points leading to this point (1, 1, and −1) are saved as the candidate alphabets. If the path metric is not less than $d_0$ then the selected point −1 is discarded as shown at 526 and the procedure returns to 512 to select a next point in the previous layer by incrementing i to i+1.

It should be noted that point 1 is not going to be tested since the path metric of the point 1 is larger than that of the point −1. Therefore, the method now moves to 512 wherein the layer index is incremented by 1 from i to i+1. Thus, the search procedure now moves to the second layer i=2. Subsequently, at 514 the value of i is verified to determine if a last layer has been reached or if i=m+1 wherein m is the number of layers being tested. If yes, the procedure terminates at the end block. As the current value of the layer index is 2≠4 the method proceeds to selecting a next point in the $i^{th}$ or $2^{nd}$ layer as shown at 508. Accordingly the point −1 with the branch metric 4 is selected and the points below leading to nodes 8 and 6 are tested to check if they satisfy the condition for being selected as the candidate alphabets as described supra. Thus, upon exploring the possibilities under the node 5, the procedure moves up the binary tree back to the first layer and a next point −1 (node 4) is selected as shown at 508. Subsequently the branches below the node 4 are searched and a best candidate alphabet is updated and saved at 524 as detailed herein. The selected value of $d_i$ modified as $d_0-\beta_{i-1}$ from the original value of $d_0$ used in the sphere search method contributes towards reducing the number of branches within the binary tree that are searched thereby speeding up or simplifying the search process. Although for brevity, the procedure herein has been described with reference to a binary tree of three layers, it can be appreciated that this is by the way of illustration and not limitation. The procedure can be applied to any (binary or non-binary) tree irrespective of the number of its layers.

Figure 6:
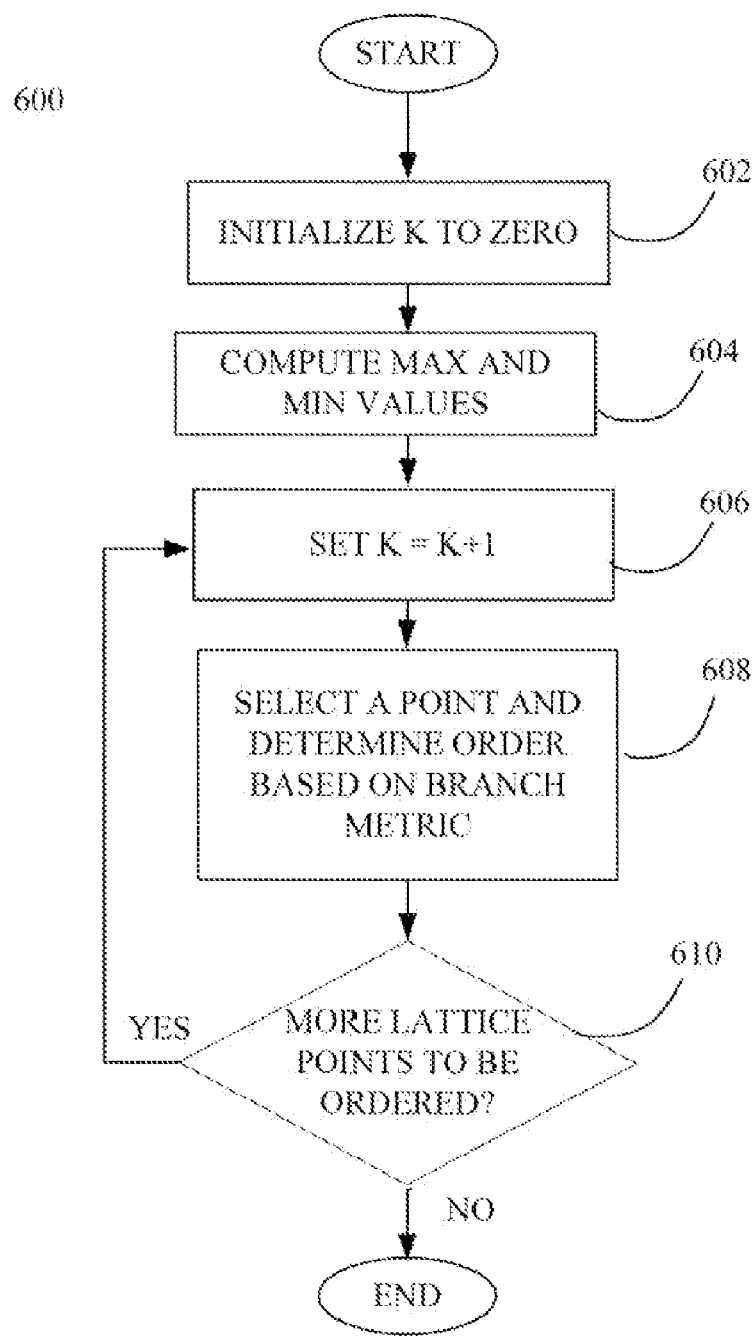
FIG. 6 illustrates another aspect related to ordering of the lattice points within a given layer while investigating the candidate alphabets.

FIG. 6 illustrates another aspect related to ordering of the lattice points within a given layer while investigating the candidate alphabets for Eq. (9). In this figure k denotes the lattice point to be ordered in a layer i. The points are ordered based on their respective branch metric values. The procedure begins at 602 wherein k is initialized to zero. At 604, maximum and minimum values for integer components of $s_m$ are calculated wherein the range for integer components of $s_m$ is expressed by:

$$s_{n,max} \geq s_n \geq s_{n,min} \quad (26)$$

By denoting $$\xi_n = \sum_{k=n+1}^{m} r_{n,k} s_k$$

in Eq. (17) $s_{n,max}$ and $s_{n,min}$ are:

$$s_{n,max} = \frac{1}{r_{n,n}} \left[ y'_n - \xi_n + \sqrt{d_0 - P_{n+1}} \right] \quad (27)$$

$$s_{n,min} = \frac{1}{r_{n,n}} \left[ y'_n - \xi_n + \sqrt{d_0 - P_{n+1}} \right] \quad (28)$$

At 606, k is incremented by 1 to k+1. A point between the maximum and minimum values for integer components of $s_m$ is selected and ordered based on its branch metric value as shown at 608. In accordance with an aspect, the branch metric can be calculated using Eq. (16). In a further aspect, the points are ordered in ascending order of their respective branch metric values such that the first lattice point in this ordering is the one with the smallest branch metric. Other factors such as probability of the point being selected as candidate solution may be alternatively used in ordering the points within a layer in accordance with different aspects. At 610, it is determined if there are more lattice points to be ordered in the particular layer. For example, if k>Ns it can be determined that all the lattice points in the layer are ordered. If yes, it is determined that there are more lattice points to be ordered in the layer, the procedure returns to 606 wherein k is incremented to proceed to the next lattice point, else, the procedure terminates at the end block. The sorting algorithm is described herein by the way of illustration and not limitation. It may be appreciated that other sorting algorithms can be used to sort the points within a layer while implementing the radius adaptive sphere decoding methodology detailed supra.

Figure 7B:
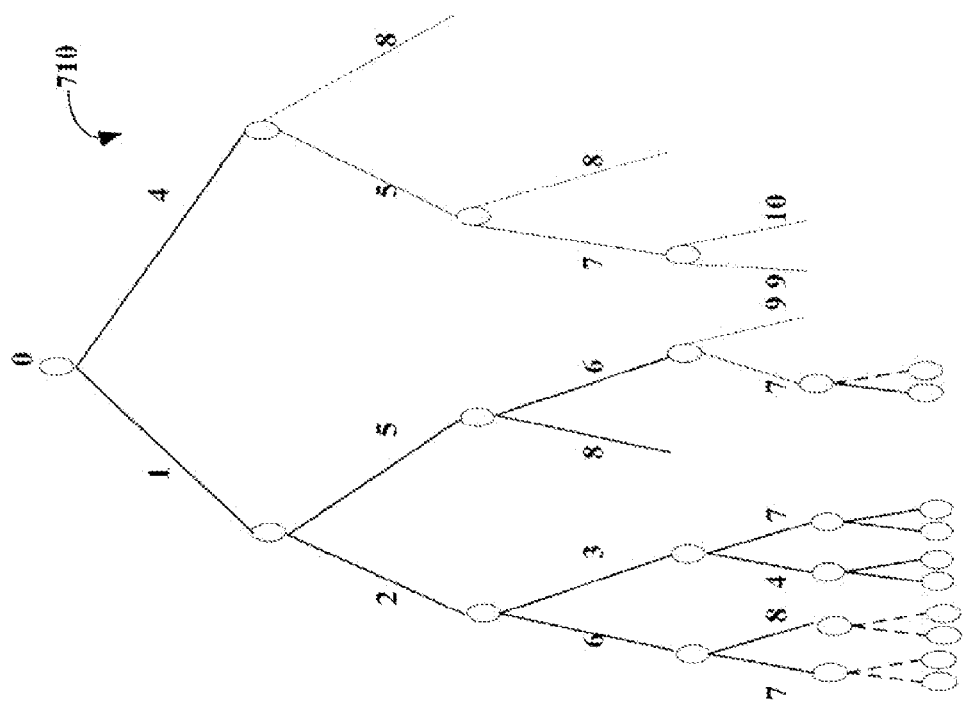
FIG. 7B illustrates radius-adaptive sphere decoding in a binary tree in accordance with an aspect.
Figure 7A:
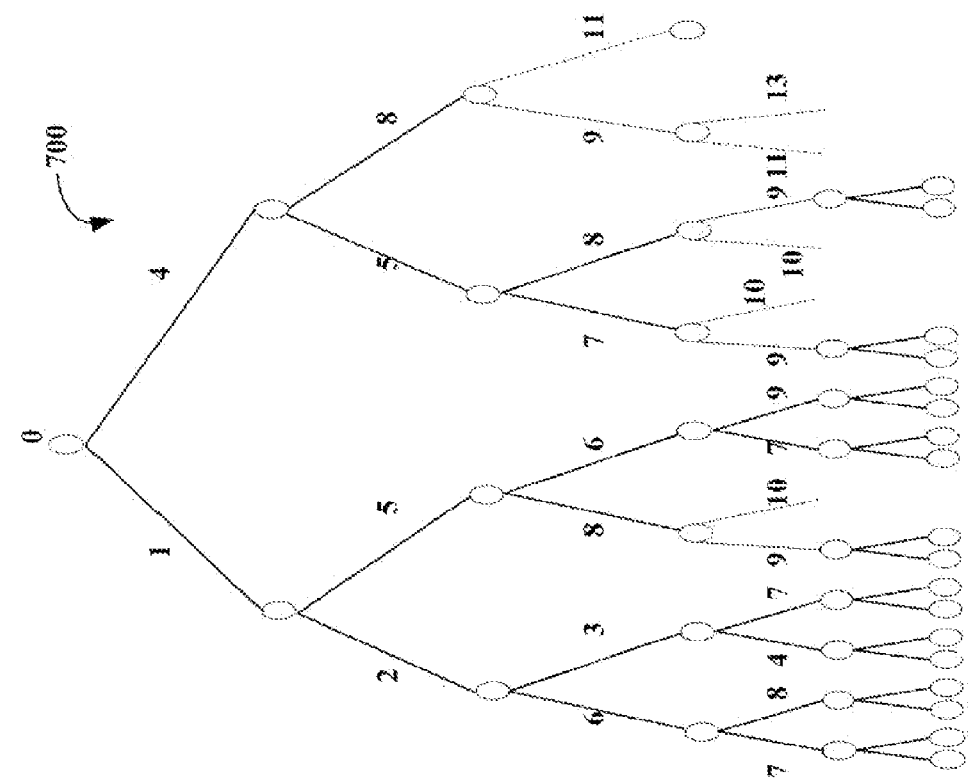
FIG. 7A is an illustration of sphere decoding in a binary tree in accordance with an aspect.

FIG. 7A is an illustration 700 of sphere decoding in a binary tree in accordance with an aspect. As seen in the illustration, the binary tree has a tree-like structure wherein each vertex has at most two children. According to the SD algorithm, the branches of the tree with a Euclidean distance larger than the give sphere radius are never searched. As stated supra, the closest lattice point to the received vector within a sphere of a given radius is identified where each vector (codeword) is represented by a lattice point in a lattice field. Since sphere decoding outputs any lattice point inside the sphere, the nearest lattice point to the received vector, or ML solution is found by enumerating all the lattice points inside the sphere. However, since the necessary condition is too loose for the bottom layer of the matrices in Eq. (9), most branches outside the sphere constraint are retained until the search proceeds to upper layers of this equation. Illustrated in this figure, is a search tree for two-level set when the modified sphere radius is set to 10. In this example, all branches in the second layer are being search even though the children of the branch with path metric labeled 8 are highly likely to be outside of the sphere radius. When the code (channel matrix) with very long constraint lengths m (rank of channel matrix) is being used or L (the number of level in Λ) increases, the situation would be exacerbated.

FIG. 7B illustrates radius-adaptive sphere decoding in a binary tree in accordance with an aspect. As shown in FIG. 7A, 710 is a two-level tree employing radius-adaptive SD algorithm described supra. Accordingly, a more stringent necessary condition is employed at the initial bottom layer thereby more branches are pruned in an early layer which reduces computational intensity. For example, in contrast to the tree shown in FIG. 7A, adapting the more stringent necessary condition at the bottom layer has facilitated an easier search by removing branches with path metric equal to or greater than 8 from the search.

Figure 8:
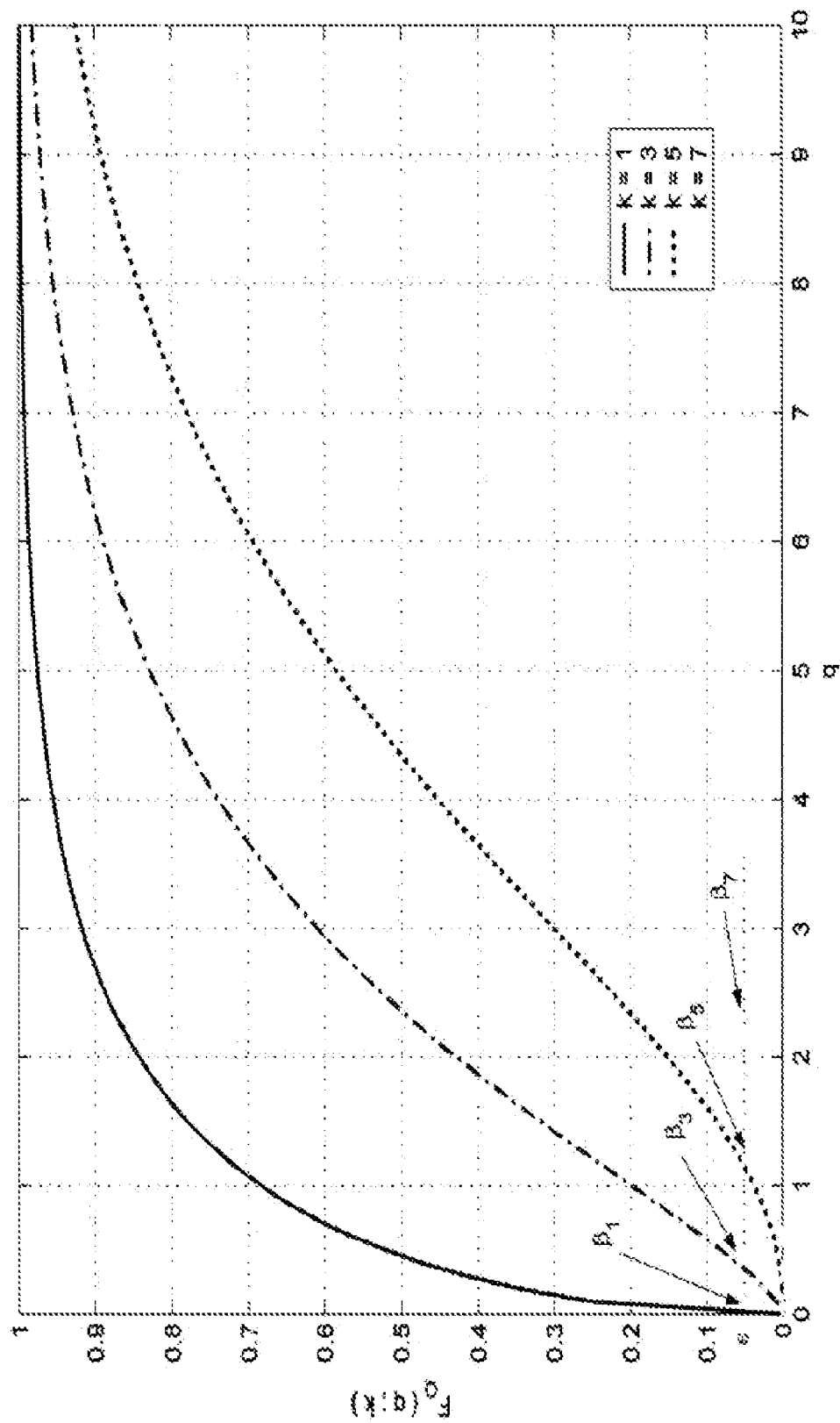
FIG. 8 displays the CDF (cumulative distribution function) of $Q_K$ and $\beta_K$ values.

FIG. 8 displays the CDF of $Q_K$ and $\beta_K$ values. Since degree of freedom is large in the early layers so is $\beta_K$. On the other hand, $\beta_K$ in the final layers is small since the degree of freedom is small. Hence, imposing noise constraint on SD algorithm affects more in the early layers than final layers. In the final layers, sphere constraint dominates the searching process. Thus, addition of probabilistic noise constraint to the SD methodology simplifies search by pruning more branches early.

Figure 9:
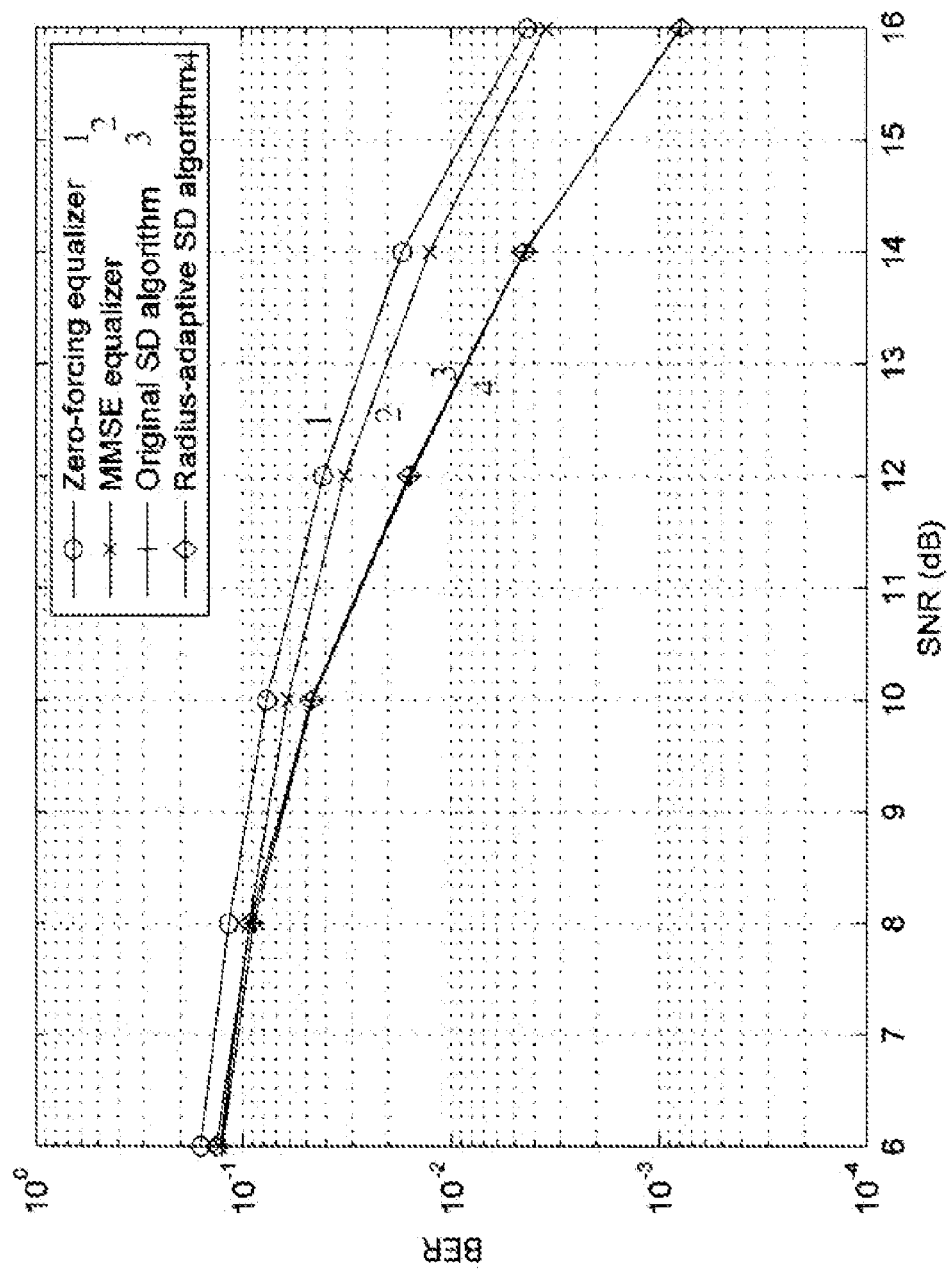
FIG. 9 is a simulation result for 16-QAM (Quadrature Amplitude Modulation) transmission over frequency selective channel with additive Gaussian noise.

FIG. 9 is a simulation result for 16-QAM (Quadrature Amplitude Modulation) transmission with frequency selective channel with additive Gaussian noise. The SNR (signal-to-noise ratio) is plotted on the X-Axis while the corresponding BER (Bit Error Rate) for a given transmission is plotted on the Y-Axis. The figure shows BER performance for MMSE (Minimum Mean Square Error), ZF (Zero Forcing) equalizers as well as SD and radius-adaptive SD methodologies. The dimension of the channel matrix H is set to 11 and pruning probability of the radius-adaptive SD algorithm is $\epsilon=0.03$. As seen from the figure, although the radius-adaptive SD method prunes more branches early in the sphere search, the error performance for both SD as well as radius adaptive SD methodologies remains substantially similar as both the curves 3 and 4 follow substantially similar paths. Hence, it can be concluded that radius-adaptive SD methodology reduces computational complexity without any significant erosion of accuracy. Further, as seen from the figure, radius-adaptive SD algorithm offers considerable performance benefit over MMSE methodology.

Figure 10:
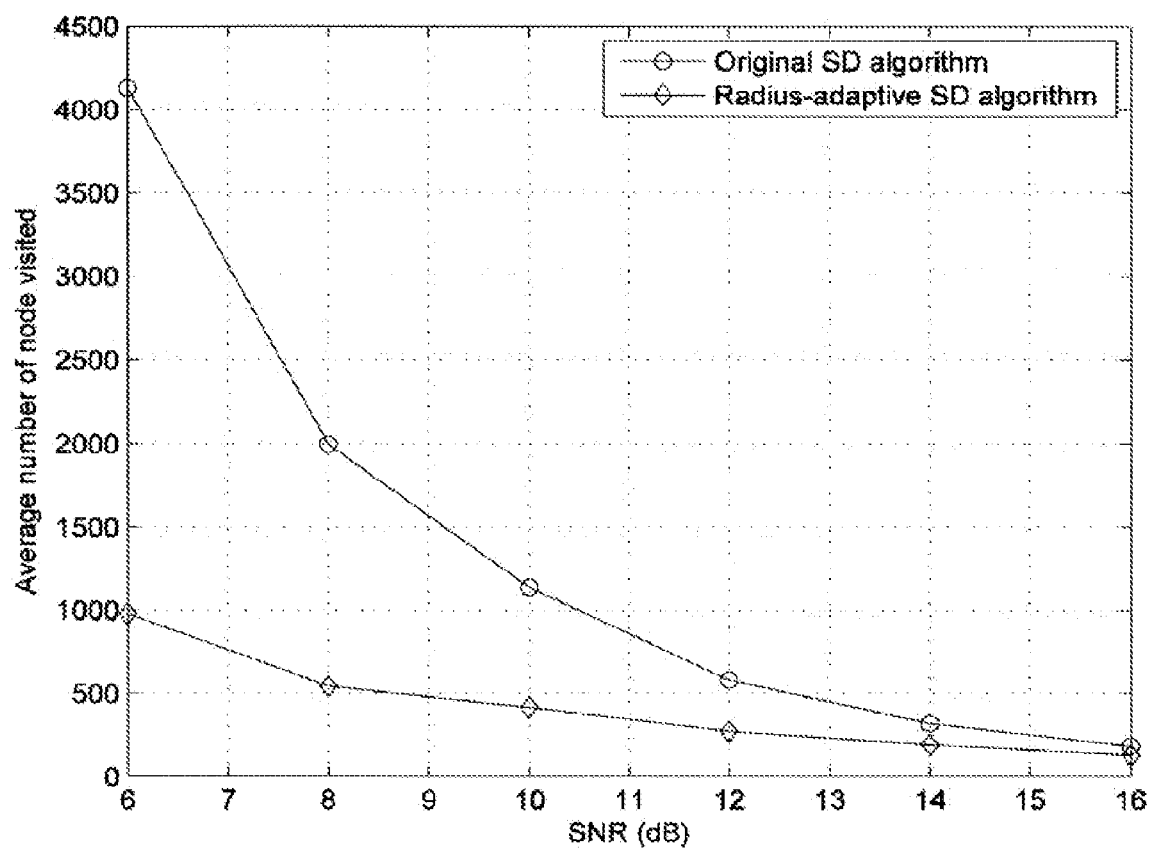
FIG. 10 is another simulation result wherein the SNR of the received signal is plotted against the number of nodes visited to decode symbols in the corresponding signals.

FIG. 10 is another simulation result wherein the SNR of the received signal is plotted against the number of nodes visited to decode symbols in the corresponding signals. Here, computational complexity is represented as number of nodes visited for the SD vs radius-adaptive SD methodologies. As seen from the figure, the complexity reduction in the low SNR is significant (more than 70%) than in high SNR regime where it is about 30%. Therefore, as mentioned supra, by increasing the pruning probability, significant reduction in computational complexity can be achieved.

Figure 11:
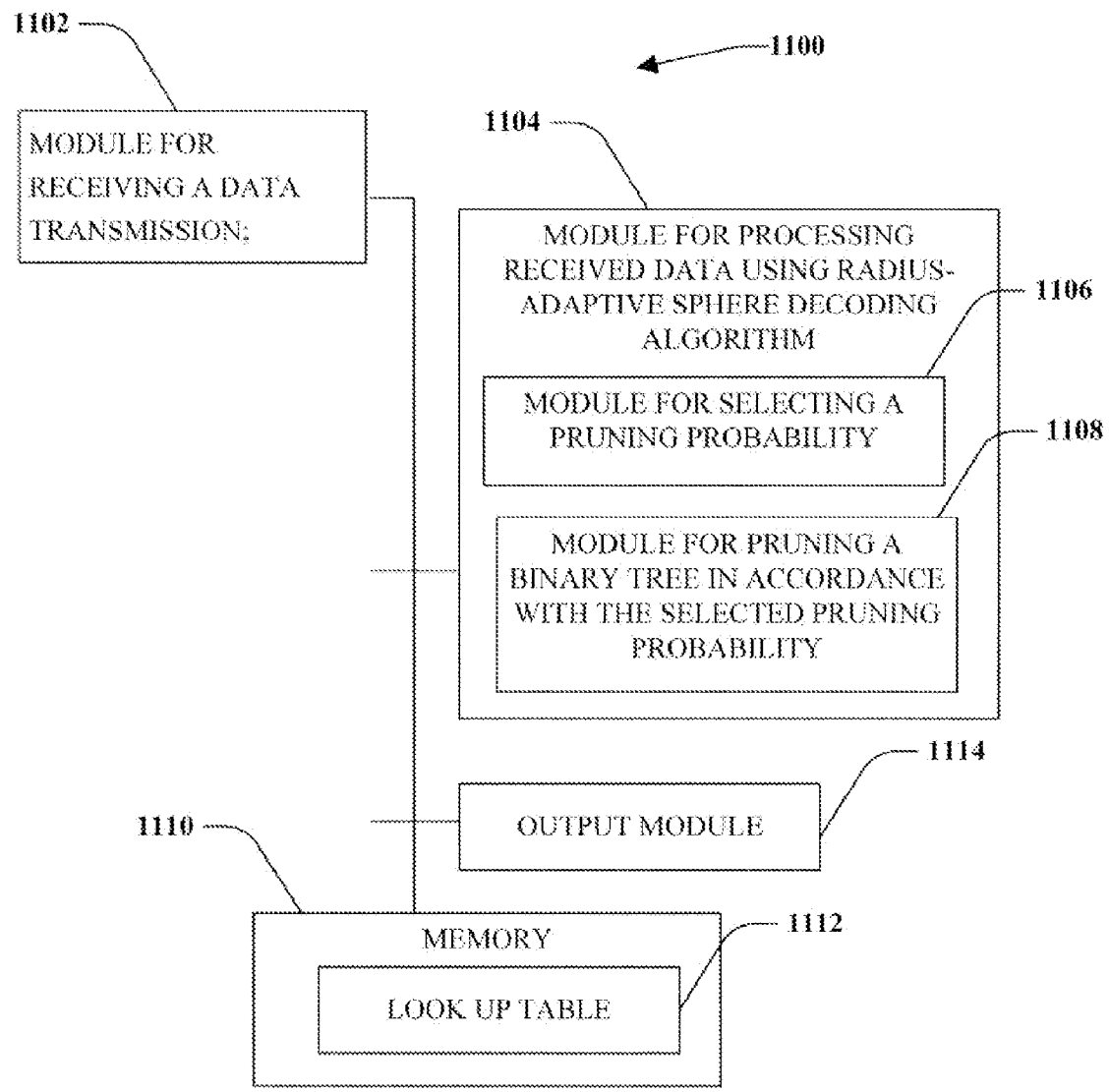
FIG. 11 illustrates a system that facilitates implementing radius-adaptive sphere decoding in a communication system.

Referring now to FIG. 11 a system 1100 that facilitates implementing radius-adaptive sphere decoding in a communication system is illustrated. The modules shown herein may be one or more processors and may be coupled to the memory module 1110. The system can comprise a receiving module 1102 that receives data transmissions. The data can be control data or user data in accordance with various aspects. The receiving module 1102 can convey the received data streams to a processing module 1104, also comprised within the system 1110, for processing the received data in accordance with the radius-adaptive SD methodology. As stated supra, the received data is analyzed by imposing a probabilistic noise constraint to the branches of the binary tree within a Euclidean distance less than or equal to the given sphere radius. The probabilistic noise constraint imposes a more stringent necessary condition in the early stages of the search to prune more branches in accordance with a predetermined pruning probability. Accordingly, a selection module 1106 is comprised within the processing module to determine a pruning probability. As described herein, the pruning probability can be determined by considering a small number of β values. These values can be determined by using employing various AI techniques detailed supra that take into consideration a number of attributes of the communication system, such as, the number of layers in the system matrix which may have an order of ten in many systems. These precomputed values may be stored in a look-up table 1112 that can be located in the memory module 1110 as shown. If a pre-computed value of pruning probability already exists for a given set of system attributes within the look up table 1112, such a value can be readily recovered by the selection module 1116 to be used for decoding. The processing module can also contain a pruning module 1108 to prune branches of a binary tree in accordance with the pruning probability as determined by the module 1106. Based on the accuracy of the decoded output provided by the output module 1114, as well as the time taken to provide the output, the pruning probability can be adjusted (increased or decreased in accordance with different aspects) thereby providing an optimal balance between computational complexity versus time. Although modules 1104, 1106 and 1108 are shown as separate modules it can be appreciated that the functions described herein may be carried out by a greater or lesser number of modules than described supra.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of decoding data exchanged in a communication system, the method comprising:
   receiving a code word in a data transmission;
   performing a sphere decoding operation that searches for a nearest lattice point to the received code word, the sphere decoding operation pruning a branch of a search tree when a probability of the branch is less than a threshold, the probability of the branch being a probability that a difference between a radius of a search sphere and a path metric for the branch is greater than a probabilistic noise constraint; and
   outputting data associated with the nearest lattice point as the received code word.

2. The method of claim 1, wherein the nearest lattice point is in a lattice field, lattice points in the lattice field representing different possible code words.

3. The method of claim 2, further comprising determining the radius of the search sphere.

4. The method of claim 2,
   wherein the received code word results from a multiplication of a system matrix by an original code word; and
   wherein the lattice points are associated with a plurality of layers of the system matrix.

5. The method of claim 4, wherein the probabilistic noise constraint models contributions from later layers of the system matrix by equivalent noises, the later layers being later than a layer of the system matrix associated with the branch.

6. The method of claim 5, wherein the branch is associated with an nth layer of the system matrix and a necessary condition for a branch in the nth layer of the system matrix to be searched is:

$$d_0 \geq P_n + \sum_{j=1}^{n-1} v_j^2$$

wherein $d_0$ is a modified radius of the search sphere, $P_n$ is the path metric of the branch, and $$\sum_{j=1}^{n-1} v_j^2$$

is the probabilistic noise constraint modeling noise of layers 1 to (n−1) of the system matrix.

7. The method of claim 1, further comprising:
   storing precomputed values in a look-up table; and
   if the values in the look-up table include a value for a given set of system attributes, recovering the value from the look-up table, wherein the threshold is a function of the value.

8. The method of claim 1, further comprising defining a time threshold for completing the search.

9. The method of claim 8, further comprising increasing or lowering the threshold in accordance with a time taken to complete the search.

10. The method of claim 9, wherein the threshold is increased if the time taken to complete the search is larger than the time threshold.

11. The method of claim 9, wherein the threshold is decreased if the time taken to complete the search is less than the time threshold.

12. The method of claim 9, further comprising observing different sphere decoding operations and determining acceptable time intervals thereby.

13. The method of claim 9, wherein the threshold is adjusted for a single sphere decoding operation and the sphere decoding operation is repeated with a new threshold.

14. The method of claim 9, wherein a threshold for a second sphere decoding operation is adjusted based on time taken by an earlier decoding operation.

15. The method of claim 1, wherein prior information of each symbol is included into the radius of the search sphere during the sphere decoding operation.

16. An apparatus for decoding data, the apparatus being within a communication system, the apparatus comprising:
   a receiving module that receives a code word in a data transmission; and
   a processing module that decodes at least a code word from the data transmission at least in part by performing a sphere decoding operation for a nearest lattice point to the received code word, the sphere decoding operation pruning a branch of a search tree when a probability of the branch is less than a threshold, the probability of the branch being a probability that a difference between a radius of a search sphere and a path metric for the branch is greater than a probabilistic noise constraint.

17. The apparatus of claim 16, wherein the processing module further comprises a probability selection module that determines values using techniques that take into consideration attributes of the communication system, the threshold being a function of one of the values.

18. The apparatus of claim 17,
   further comprising a memory module that stores pre-computed values in a look-up table,
   wherein if the values in the look-up table include a value for a given set of system attributes, the selection module recovers the value for use in decoding.

19. The apparatus of claim 16, further comprising an output module that outputs data associated with the lattice point as received data.

20. A processor readable medium comprising instructions for:
   receiving a code word in a data transmission;
   performing a sphere decoding operation that searches for a nearest lattice point to the received code word, the sphere decoding operation pruning a branch of a search tree when a probability of the branch is less than a threshold, the probability of the branch being a probability that a difference between a radius of a search sphere and a path metric for the branch is greater than a probabilistic noise constraint; and outputting data associated with the nearest lattice point as the received code word.

21. The medium of claim 20, wherein the nearest lattice point is in a lattice field, lattice points in the lattice field representing different possible code words.

22. The medium of claim 21, further comprising instructions for determining the radius of the search sphere.

23. The medium of claim 20,
wherein the received code word results from a multiplication of a system matrix by an original code word; and
wherein the lattice points are associated with a plurality of layers of the system matrix.

24. The medium of claim 23, wherein the probabilistic noise constraint models contributions from later layers of the system matrix by equivalent Gaussian noises, the later layers being later than a layer of the system matrix associated with the branch.

25. The medium of claim 24, wherein the branch is associated with an nth layer of the system matrix and the medium comprises instructions for applying a necessary condition to the nth layer of the system matrix in order to determine if the nth layer should be searched.

26. The medium of claim 25, wherein the necessary condition is:

$$d_0 \geq P_n + \sum_{j=1}^{n-1} v_j^2$$

wherein $d_0$ is a modified radius of the search sphere, $P_n$ is the path metric of the branch, and $$\sum_{j=1}^{n-1} v_j^2$$

is the probabilistic noise constraint modeling noise of layers 1 to (n−1) of the system matrix.

27. The medium of claim 20, comprising instructions for:
storing precomputed values in a look-up table; and
if a value exists for a given set of system attributes within the look-up table, recovering the value from the look-up table, wherein the threshold is a function of the value.

28. The medium of claim 20, further comprising instructions for determining a time threshold for completing the search.

29. The medium of claim 28, further comprising instructions for increasing or lowering the threshold in accordance with a time taken to complete the search.

30. The medium of claim 29, further comprising instructions for increasing the threshold if time taken to complete the search is larger than the time threshold.

31. The medium of claim 29, further comprising instructions for decreasing the threshold if time taken to complete the search is less than the time threshold.

32. The medium of claim 29, further comprising instructions for observing different sphere decoding operations and determining acceptable time intervals thereby.

33. The medium of claim 29, further comprising instructions for setting a new value for the threshold in a single sphere decoding operation and repeating the sphere decoding operation with the new value for the threshold.

34. The medium of claim 28, further comprising instructions for determining a threshold for a second sphere decoding operation based on time taken by an earlier sphere decoding operation.

35. The medium of claim 20, further comprising instructions for including prior information of each symbol into the radius of the search sphere during the sphere decoding operation.

36. An apparatus for decoding data transmitted within a communication system, the apparatus comprising:
means for receiving a code word a data transmission;
means for processing that performs a sphere decoding operation that searches for a nearest lattice point to the received code word, the sphere decoding operation pruning a branch of a search tree when a probability of the branch is less than a threshold, the probability of the branch being a probability that a difference between a radius of a search sphere and a path metric for the branch is greater than a probabilistic noise constraint.

37. The apparatus of claim 36 comprising means for determining values using techniques that take into consideration attributes of the communication system, the threshold being a function of one of the values.

38. The apparatus of claim 36, further comprising means for storing pre-computed values in a look-up table, wherein if a value for a given set of system attributes exists within the look-up table, the selection module recovers the value for use in decoding.

39. The apparatus of claim 36, further comprising means for outputting data associated with the nearest lattice point as received data.

* * * * *